United States Patent
Huyghe et al.

(10) Patent No.: US 9,751,364 B2
(45) Date of Patent: Sep. 5, 2017

(54) MULTILAYER LAMINATE WHICH CAN BE USED FOR THE REINFORCEMENT OF A TYRE BELT

(71) Applicants: COMPAGNIE GENERALE DES ESTABLISSEMENTS MICHELIN, Clermont-Ferrand (FR); Michelin Recherche et Technique S.A., Granges-Paccot (CH)

(72) Inventors: Jean-Michel Huyghe, Clermont-Ferrand (FR); Christophe Le Clerc, Clermont-Ferrand (FR); Aline Riou, Clermont-Ferrand (FR); Anne-Lise Thuilliez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 382 days.

(21) Appl. No.: 14/373,273

(22) PCT Filed: Feb. 21, 2013

(86) PCT No.: PCT/EP2013/053445
§ 371 (c)(1),
(2) Date: Jul. 18, 2014

(87) PCT Pub. No.: WO2013/127685
PCT Pub. Date: Jun. 9, 2013

(65) Prior Publication Data
US 2015/0136298 A1    May 21, 2015

(30) Foreign Application Priority Data
Feb. 29, 2012 (FR) ...................... 12 51845

(51) Int. Cl.
*B60C 1/00*  (2006.01)
*B60C 9/18*  (2006.01)
(Continued)

(52) U.S. Cl.
CPC ................ *B60C 1/00* (2013.01); *B32B 25/08* (2013.01); *B32B 25/12* (2013.01); *B32B 27/34* (2013.01);
(Continued)

(58) Field of Classification Search
CPC .................................. B60C 9/18; B60C 19/00
See application file for complete search history.

(56) References Cited

U.S. PATENT DOCUMENTS

| 5,409,657 | A | 4/1995 | Gerwig et al. | ............. 264/290.2 |
| 5,843,583 | A | 12/1998 | D'Haene et al. | ............. 428/592 |

(Continued)

FOREIGN PATENT DOCUMENTS

| CN | 1953880 A | 4/2007 |
| DE | 36 21 205 A1 | 1/1988 |

(Continued)

OTHER PUBLICATIONS

A. Lardjane, U.S. Appl. No. 14/372,919, filed Jan. 31, 2013.
(Continued)

*Primary Examiner* — Justin Fischer
(74) *Attorney, Agent, or Firm* — Fitzpatrick, Cella, Harper & Scinto

(57) ABSTRACT

A multilayer laminate, which is usable as a reinforcing element for a finished article or for a semifinished product made of rubber, such as a tire, includes at least one polymer film having, in any tensile direction in the film's plane, a Young's modulus that is greater than 500 MPa. The film is positioned between and in contact with two layers formed of a rubber composition, such as natural rubber. Each layer (Continued)

formed of the rubber composition exhibits, in a crosslinked state, a secant modulus that, in extension at 10% elongation, is greater than 30 MPa, with between 30 and 150 MPa being preferable for the secant modulus.

17 Claims, 2 Drawing Sheets

(51) Int. Cl.
- *B32B 25/08* (2006.01)
- *B32B 25/12* (2006.01)
- *B32B 27/34* (2006.01)
- *B32B 27/36* (2006.01)

(52) U.S. Cl.
CPC ............... *B32B 27/36* (2013.01); *B60C 9/18* (2013.01); *B32B 2250/03* (2013.01); *B32B 2250/24* (2013.01); *B32B 2250/40* (2013.01); *B32B 2260/021* (2013.01); *B60C 2001/0066* (2013.01); *B60C 2009/1828* (2013.01); *Y10T 152/1081* (2015.01); *Y10T 152/10495* (2015.01); *Y10T 428/3175* (2015.04); *Y10T 428/31797* (2015.04); *Y10T 428/31924* (2015.04)

(56) References Cited

U.S. PATENT DOCUMENTS

| | | | |
|---|---|---|---|
| 5,871,597 A | 2/1999 | Vasseur | 152/209 R |
| 6,475,636 B1 | 11/2002 | D'Haene et al. | 428/592 |
| 6,766,841 B2 | 7/2004 | Cordonnier et al. | 152/527 |
| 6,962,182 B2 | 11/2005 | Cordonnier et al. | 152/527 |
| 7,089,726 B2 | 8/2006 | Domingo et al. | 57/237 |
| 7,594,380 B2 | 9/2009 | Barguet et al. | 57/220 |
| 8,033,311 B2 | 10/2011 | Alvarez et al. | 152/547 |
| 8,178,210 B2 | 5/2012 | Forloni et al. | 428/483 |
| 8,281,562 B2 | 10/2012 | Alvarez et al. | 57/223 |
| 9,186,871 B2 * | 11/2015 | Le Clerc | B32B 25/08 |
| 2004/0129360 A1 | 7/2004 | Vidal | 152/537 |
| 2005/0183808 A1 | 8/2005 | Barguet et al. | 152/527 |
| 2006/0179813 A1 | 8/2006 | Vanneste et al. | 57/211 |
| 2007/0272338 A1* | 11/2007 | Galimberti | B60C 1/00 152/458 |
| 2008/0026244 A1 | 1/2008 | Barbotin et al. | 428/625 |
| 2011/0108179 A1 | 5/2011 | Guerinon | 152/537 |
| 2011/0143160 A1 | 6/2011 | Barguet et al. | 428/592 |
| 2012/0090756 A1 | 4/2012 | Le Clerc | 152/527 |
| 2014/0069563 A1 | 3/2014 | Le Clerc | 152/527 |

FOREIGN PATENT DOCUMENTS

| | | |
|---|---|---|
| EP | 0 229 346 A1 | 7/1987 |
| EP | 0 279 611 A2 | 8/1988 |
| EP | 0 414 892 A1 | 3/1991 |
| EP | 0 539 302 A1 | 4/1993 |
| EP | 0 722 977 A1 | 7/1996 |
| FR | 2 539 349 A1 | 7/1984 |
| FR | 2 930 194 A1 | 10/2009 |
| GB | 2 134 442 A | 8/1984 |
| WO | WO 02/053827 A1 | 7/2002 |
| WO | WO 02/053828 A1 | 7/2002 |
| WO | WO 2004/003287 A1 | 1/2004 |
| WO | WO 2004/033548 A1 | 4/2004 |
| WO | WO 2004/033789 A1 | 4/2004 |
| WO | WO 2005/011978 A1 | 2/2005 |
| WO | WO 2005/014925 A1 | 2/2005 |
| WO | WO 2005/113259 A1 | 12/2005 |
| WO | WO 2005/113666 A1 | 12/2005 |
| WO | WO 2005/113887 A1 | 12/2005 |
| WO | WO 2010/115861 A1 | 10/2010 |

OTHER PUBLICATIONS

A. Lardjane, U.S. Appl. No. 14/372,947, filed Jan. 31, 2013.

Jérémy Buisson, "MICH2MF—Michelin Indoor Characterization for Handling Applied to Mathematical Formulae," Aachener Kolloquium Fahrzeug- and Motorentechnik, (Oct. 2006).

\* cited by examiner

MULTILAYER LAMINATE WHICH CAN BE USED FOR THE REINFORCEMENT OF A TYRE BELT

1. FIELD OF THE INVENTION

The present invention relates to multilayer laminates which can be used in particular as reinforcing elements for finished articles or semifinished products made of rubber, such as, for example, tyres having a radial carcass reinforcement.

It relates more particularly to the use of such laminates in the crown of such tyres, in particular as layers for protecting from attacks or perforations.

2. STATE OF THE ART

In a known way, a tyre having a radial carcass reinforcement comprises a tread, two non-stretchable beads, two flexible side walls connecting the beads to the tread and a rigid crown reinforcement or "belt" positioned circumferentially between the carcass reinforcement and the tread.

The tyre belt is generally composed of superimposed rubber plies which can comprise metal or textile reinforcing threads generally positioned parallel to one another within a given ply.

In particular, this belt can comprise one or more "protective" crown plies generally located under the tread and having the role of protecting the remainder of the belt from external attacks, tears or other perforations. This is, for example, the general case in the belts of tyres for heavy duty vehicles or earthmoving equipment.

These protective plies have to be sufficiently flexible and deformable in order, on the one hand, to match as best as possible the shape of the obstacle on which the belt presses during rolling and, on the other hand, to oppose the penetration of foreign bodies radially towards the inside of the belt. Satisfying such criteria requires the use, in these protective layers, of reinforcing threads in the form of cords exhibiting a high elasticity and a high energy at break.

Use is usually made of steel strand cords, also described as high-elongation cords ("HE" cords), which are assembled by the known technique of stranding and are composed of a plurality of metal strands twisted together into a helix, each strand comprising several steel wires also wound together into a helix. Such elastic strand cords have been described in a large number of patents or patent applications, in particular in order to reinforce protective crown plies for tyres for industrial vehicles, such as heavy duty vehicles or earthmoving equipment (see, for example, U.S. Pat. No. 5,843,583, U.S. Pat. No. 6,475,636, WO 2004/003287 (or US 2005/0183808), WO 2004/033789 or U.S. Pat. No. 7,089,726, WO 2005/014925 or US 2006/0179813).

However, these protective crown plies reinforced with metal strand cords have a number of disadvantages. First of all, these strand cords are relatively expensive, on two accounts: on the one hand, they are prepared in two stages, namely by prior manufacture of the strands, followed by assembling these strands by twisting; on the other hand, they generally require a high twist of their wires (i.e., very short helical pitches), a twist which is admittedly essential in order to confer on them the desired elasticity but which involves reduced manufacturing rates. This disadvantage, of course, has repercussions on the cost of the tyres themselves. Other known disadvantages of these metal cords are their sensitivity to corrosion, their weight and their relatively large bulk (external diameter).

Application WO 2010/115861 has recently provided a novel, light and efficient, multilayer laminate which makes it possible in particular to replace conventional plies reinforced with steel cords and thus to overcome the abovementioned disadvantages.

This multilayer laminate, composed of a multiaxially drawn polymer film positioned between two layers of rubber composition, has a flexible and highly deformable structure which has proved, unexpectedly, to exhibit a high resistance to the effects of perforation equivalent to that of conventional protective fabrics reinforced with metal cords, despite a markedly lower thickness.

Furthermore, this multilayer laminate has been shown to be particularly effective in belts of passenger vehicle tyres which have proven to be capable, despite a very simplified structure, of developing a drift thrust equivalent to that observed with conventional belts comprising two crossed metal working plies.

By virtue of its small thickness, this multilayer laminate exhibits in addition the significant advantage of having a low hysteresis in comparison with conventional rubber fabrics based on metal cords, which are markedly thicker, which is, of course, propitious to the reduction in the rolling resistance of the tyres.

3. BRIEF DESCRIPTION OF THE INVENTION

On continuing their research studies on this multilayer laminate, the Applicant Companies found, unexpectedly, that the rolling resistance of the tyres described in the abovementioned Application WO 2010/115861 can be further reduced by virtue of an improvement affecting the actual structure of the laminate.

Thus, according to a preferred subject-matter, the present invention relates to a multilayer laminate comprising at least one polymer film having, whatever the tensile direction considered in the plane of the film, a Young's modulus, denoted E, which is greater than 500 MPa, the said film being placed between and in contact with two layers of rubber composition, characterized in that each layer of rubber composition exhibits a secant modulus in extension at 10% elongation, denoted Ms, which is greater than 30 MPa.

The invention also relates to the use of such a laminate as reinforcing element for semifinished rubber products or finished rubber articles, such as tyres, and also to these semifinished products, finished articles and tyres themselves.

The tyres of the invention, in particular, can be intended for motor vehicles of the passenger vehicle, 4×4 or "SUV" (Sport Utility Vehicles) type but also for two-wheel vehicles, such as motor cycles or bicycles, or for industrial vehicles chosen from vans, "heavy duty vehicles", that is to say underground trains, buses, heavy road transport vehicles (lorries, tractors, trailers), off-road vehicles, such as heavy agricultural vehicles or earthmoving equipment, aircraft or other transportation or handling vehicles.

Of course, the invention relates to the above laminate in the raw state (before crosslinking the rubber) and in the cured state (after crosslinking or vulcanisation of the rubber).

The multilayer laminate of the invention can very particularly be used in belts of tyres intended in particular for the vehicles described above.

BRIEF DESCRIPTION OF THE DRAWINGS

The invention and its advantages will be easily understood in the light of the detailed description and of the implementational examples which follow, and also of FIGS. 1 to 3 relating to these examples, which give a diagrammatic representation (unless otherwise indicated, without observing a specific scale):

in radial cross section, of two examples of a tyre according to the invention incorporating a multilayer laminate according to the invention (FIG. 1 and FIG. 2);

Figure 3:
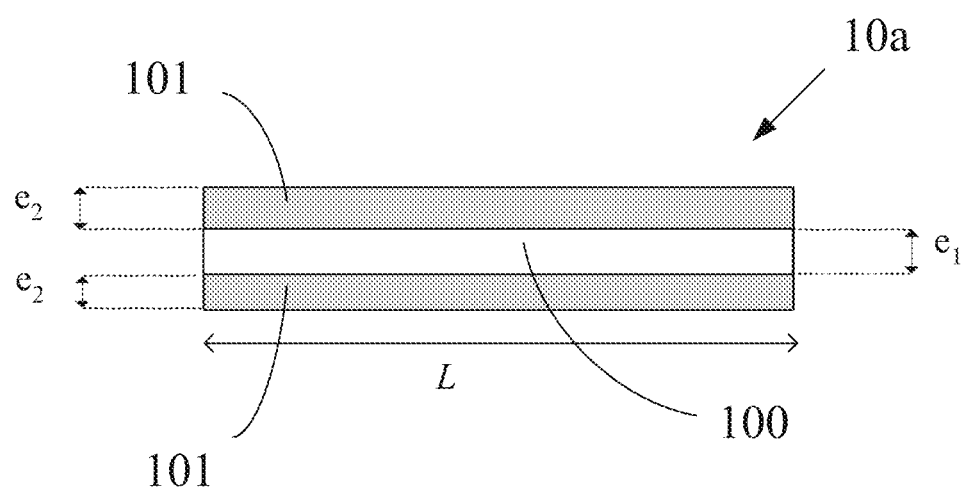

in transverse cross section, of a multilayer laminate in accordance with the invention (FIG. 3).

4. DEFINITIONS

In the present patent application:

"rubber" or "elastomer" (the two terms being regarded as synonyms) is understood to mean any type of elastomer (diene or non-diene);

"diene rubber" is understood to mean any elastomer (elastomer alone or mixture of elastomers) which results, at least in part (i.e. a homopolymer or a copolymer), from diene monomers, that is to say from monomers carrying two carbon-carbon double bonds, whether or not the latter are conjugated;

"layer" is understood to mean a strip or any other three-dimensional element of relatively low thickness with respect to its other dimensions, the ratio of the thickness to the greatest of the other dimensions of which is less than 0.5, preferably less than 0.1;

"sheet" or "film" is understood to mean any thin layer, the ratio of the thickness to the smallest of the other dimensions of which is less than 0.1;

"reinforcing thread" is understood to mean any long thin strand, any individual filament, any multifilament fibre or any assembly of such filaments or fibres, such as folded yarns or cords, having a great length relative to its cross section, capable of reinforcing the properties in extension of a rubber matrix, it being possible for this thread to be straight or nonstraight, for example twisted, or wavy;

"laminate" or "multilayer laminate" is understood to mean, within the meaning of the International Patent Classification, any product comprising at least two layers, of flat or nonflat shape, which are in contact with one another, it being possible for the latter to be bonded or connected or not to be bonded or connected to one another; the expression "bonded" or "connected" should be interpreted broadly so as to include all the means of bonding or assembling, in particular by adhesive bonding.

Moreover, unless expressly indicated otherwise, all the percentages (%) shown are percentages by weight.

Any interval of value denoted by the expression "between a and b" represents the range of values extending for more than a to less than b (that is to say, limits a and b excluded) whereas any range of values denoted by the expression "from a to b" means the range of values extending from a up to b (that is to say, including the strict limits a and b).

5. DETAILED DESCRIPTION OF THE INVENTION

The multilayer laminate of the invention thus has the essential characteristic of comprising at least one polymer film placed between and in contact with two layers of rubber composition having a high modulus, which film and layers will be described in detail below.

Use may be made of any polymer film having, whatever the tensile direction considered in the plane of the film, a Young's modulus (reminder, initial modulus in extension), denoted E, which is greater than 500 MPa.

Preferably, the film used exhibits, whatever the tensile direction under consideration (of course, in the plane of the film), a modulus in extension, denoted E, which is greater than 1000 MPa (in particular between 1000 and 4000 MPa), more preferably still greater than 2000 MPa. Values of modulus E of between 2000 and 4000 MPa are particularly desirable, in particular for the reinforcing of tyres.

According to another preferred form, whatever the tensile direction under consideration, the maximum tensile stress, denoted $\sigma_{max}$, of the film is greater than 80 MPa (in particular between 800 and 200 MPa), more preferably greater than 100 MPa (in particular between 100 and 200 MPa). Stress $\sigma_{max}$ values of greater than 150 MPa, in particular of between 150 and 200 MPa, are particularly desirable, in particular for the reinforcing of tyres.

According to another preferred form, whatever the tensile direction under consideration, the yield point, denoted Yp, of the film is located above 3% elongation, particularly between 3 and 15%. Yp values above 4%, in particular of between 4% and 12%, are particularly desirable, in particular for the reinforcing of tyres.

The mechanical properties set out above are well known to a person skilled in the art, deduced from force/elongation curves, measured, for example, according to Standard ASTM F638-02 for strips with a thickness of greater than 1 mm or also according to Standard ASTM D882-09 for films or thin sheets, the thickness of which is at most equal to 1 mm; the above values of modulus E and of stress $\sigma_{max}$, expressed in MPa, are calculated with respect to the initial section of the test specimens subjected to the tensile test.

The polymer film can be of the thermoplastic type and of the nonthermoplastic type, for example made of aramid or of cellulose.

Use is preferably made of thermoplastic polymer films, more preferably of multiaxially drawn thermoplastic polymer films, that is to say films drawn, oriented in more than one direction, such as were described in the abovementioned Application WO 2010/115861.

Such multiaxially drawn films are well known; they have been used essentially to date in the packaging industry, the food industry, in the electrical field or also as support for magnetic coatings. They are prepared according to various well known drawing techniques, all intended to confer, on the film, good mechanical properties in several main directions and not in just one direction, as is the case for normal fibres made of thermoplastic polymer (for example, PET or "Nylon") which are, in a known way, drawn monoaxially during their melt spinning Such techniques involve multiple drawing operations in several directions, longitudinal drawing operations, transverse drawing operations, planar drawing operations. Mention may in particular be made, by way of example, of the blow moulding technique with biaxial drawing. The drawing operations can be carried out on one or more occasions, it being possible for the drawing operations, when there are several, to be simultaneous or sequential. The draw ratio or ratios applied depend on the final mechanical properties targeted, generally greater than 2.

Multiaxially drawn thermoplastic polymer films and their processes of preparation have been described in numerous patent documents, for example in the documents FR 2 539 349 (or GB 2 134 442), DE 3621205, EP 229 346 (or U.S. Pat. No. 4,876,137), EP 279 611 (or U.S. Pat. No. 4,867, 937), EP 539 302 (or U.S. Pat. No. 5,409,657) and WO 2005/011978 (or US 2007/0031691).

When the film used is a thermoplastic polymer film, the latter preferably exhibits, whatever the tensile direction under consideration in the plane of the film, an elongation at break, denoted Eb, which is greater than 20% (in particular between 20% and 200%), more preferably greater than 50% (in particular between 50% and 200%).

The thermoplastic polymer film used is preferably of the thermally stabilised type, that is to say that it has been subjected, after drawing, to one or more heat treatments intended, in a known way, to limit its thermal contraction (or shrinkage) at high temperature; such heat treatments can consist in particular of annealings, temperings or combinations of such annealings or temperings.

Thus, and preferably, the thermoplastic polymer film used exhibits, after 30 min at 150° C., a relative contraction of its length which is less than 5%, preferably less than 3% (measured according to ASTM D1204).

The melting point of the thermoplastic polymer used is preferably chosen to be greater than 100° C., more preferably greater than 150° C., in particular greater than 200° C., especially in the case of reinforcement of tyres.

The thermoplastic polymer is preferably selected from the group consisting of polyamides, polyesters and polyimides, more particularly from the group consisting of polyamides and polyesters. Mention may in particular be made, among the polyamides, of polyamide 4,6, polyamide 6, polyamide 6,6, polyamide 11 or polyamide 12. Mention may be made, among the polyesters, for example, of PET (polyethylene terephthalate), PEN (polyethylene naphthalate), PBT (polybutylene terephthalate), PBN (polybutylene naphthalate), PPT (polypropylene terephthalate) or PPN (polypropylene naphthalate).

The thermoplastic polymer is preferably a polyester, more preferably a PET or PEN.

Examples of multiaxially drawn PET or PEN thermoplastic polymer films suitable for the multilayer laminate of the invention are, for example, the biaxially drawn PET films sold under the "Mylar" and "Melinex" names (DuPont Teijin Films) or also "Hostaphan" name (Mitsubishi Polyester Film), or the biaxially drawn PEN films sold under the "Teonex" name (DuPont de Nemours).

In the multilayer laminate of the invention, the thickness $e_1$ of the polymer film is preferably between 0.05 and 1 mm, more preferably between 0.1 and 0.7 mm. For example, film thicknesses of 0.20 to 0.60 mm have proved to be entirely suitable for use in a tyre belt.

The polymer film can comprise additives added to the polymer, in particular during the forming of the latter, it being possible for these additives to be, for example, agents for protecting from aging, plasticizers, fillers, such as silica, clays, talc, kaolin or also short fibres; fillers can, for example, be used to render the surface of the film rough and to thus contribute to improving its hold of adhesive and/or its adhesion to the rubber layers with which it is intended to be in contact.

Each constituent layer of rubber composition, or hereinafter "rubber layer", of the multilayer laminate of the invention is based on at least one diene or nondiene elastomer (for example thermoplastic elastomer); it is preferably a composition of the crosslinked or crosslinkable type, that is to say that it then comprises a suitable crosslinking system (in particular a vulcanisation system) for making possible the crosslinking (curing) of the composition during its curing (or curing of the rubber article, such as tyre, incorporating the multilayer laminate of the invention).

It has the essential characteristic of being at very high stiffness, that is to say of exhibiting a particularly high secant modulus in extension: at 10% elongation, the modulus Ms of each rubber composition is by definition greater than 30 MPa, preferably between 30 and 150 MPa.

It may be noted here and now that such a range of stiffness and modulus is entirely unusual for a rubber composition intended to be used as tyre belt, the usual range for a person skilled in the art being instead between 5 and 20 MPa, as taught in a great number of patents or patent applications (see, for example, EP 722 977 or U.S. Pat. No. 6,169,137, WO 02/053827 or U.S. Pat. No. 6,766,841, WO 02/053828 or U.S. Pat. No. 6,962,182, WO 2004/003287 or U.S. Pat. No. 7,594,380, WO 2005/113666 or US 2008/0026244, WO 2004/033548 or US 2004/0129360), in particular in the abovementioned Application WO 2010/115861.

Preferably, the rubber is a diene rubber. In a known way, diene elastomers can be classified into two categories: "essentially unsaturated" or "essentially saturated". The term "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content of units of diene origin, always less than 15%). In the category of "essentially unsaturated" diene elastomers, the term "highly unsaturated" diene elastomer is understood to mean in particular a diene elastomer having a content of units of diene origin (conjugated dienes) which is greater than 50%.

Although it is applicable to any type of diene elastomer, the present invention is preferably implemented with a diene elastomer of the highly unsaturated type.

This diene elastomer is more preferably selected from the group consisting of polybutadienes (BRs), natural rubber (NR), synthetic polyisoprenes (IRs), butadiene copolymers, isoprene copolymers and the mixtures of these elastomers, such copolymers being selected in particular from the group consisting of butadiene/styrene copolymers (SBRs), isoprene/-butadiene copolymers (BIRs), isoprene/styrene copolymers (SIRs) and isoprene/butadiene/-styrene copolymers (SBIRs).

A particularly preferred embodiment consists in using an "isoprene" elastomer, that is to say an isoprene homopolymer or copolymer, in other words a diene elastomer selected from the group consisting of natural rubber (NR), synthetic polyisoprenes (IRs), isoprene copolymers and the mixtures of these elastomers.

The isoprene elastomer is preferably natural rubber or a synthetic polyisoprene of cis-1,4-type. Use is preferably made, among these synthetic polyisoprenes, of polyisoprenes having a content (mol %) of cis-1,4-bonds of greater than 90%, more preferably still of greater than 98%. According to a preferred embodiment, each layer of rubber composition comprises from 50 to 100 phr (parts by weight per hundred parts of elastomer) of natural rubber. According to other preferred embodiments, the diene elastomer can be composed, in all or part, of another diene elastomer, such as, for example, an SBR elastomer, used or not used as a blend with another elastomer, for example of the BR type.

The rubber composition can comprise just one or several diene elastomer(s), it being possible for the latter to be used in combination with any type of synthetic elastomer other than diene elastomer, indeed even with polymers other than elastomers. The rubber composition can also comprise all or part of the additives normally used in rubber matrices intended for the manufacture of tyres, such as, for example, reinforcing fillers, such as carbon black or silica, coupling agents, antiaging agents, antioxidants, plasticizing agents or extending oils, plasticizing resins having a high Tg (glass transition temperature) of greater than 30° C., agents which facilitate the processing (processability) of the compositions in the raw state, tackifying resins, antireversion agents, methylene acceptors and donors, such as, for example, HMT (hexamethylenetetramine) or H3M (hexamethoxymethylmelamine), reinforcing resins (such as resorcinol or bismaleimide), known adhesion having promoting systems of the metal salt type, for example, in particular cobalt, nickel or lanthanide salts, or a crosslinking or vulcanisation system.

Preferably, the crosslinking system of the rubber composition is a "vulcanisation" system, that is to say a system based on sulphur (or on a sulphur-donating agent) and on a primary vulcanisation accelerator. Various known secondary vulcanisation accelerators or vulcanisation activators, such as stearic acid, zinc oxide, guanidine derivatives, retarders or antireversion agents can be added to this vulcanisation system.

Use may be made, as (primary or secondary) accelerator, of any compound capable of acting as accelerator of the vulcanisation of diene elastomers in the presence of sulphur, in particular accelerators of the thiazole type and their derivatives, accelerators of sulphenamides, thiuram, dithiocarbamate, dithiophosphate, thiourea and xanthate types. Mention may in particular be made, as examples of such accelerators, of the following compounds: 2-mercaptobenzothiazyl disulphide (abbreviated to "MBTS"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), tetrabenzylthiuram disulphide ("TBZTD"), zinc dibenzyldithiocarbamate ("ZBEC"), 1-phenyl-2,4-dithiobiuret ("DTB"), zinc dibutyl phosphorodithioate ("ZBPD"), zinc 2-ethylhexyl phosphorodithioate ("ZDT/S"), bis[O,O-di(2-ethylhexyl)thiophosphonyl]disulphide ("DAPD"), dibutylthiourea ("DBTU"), zinc isopropyl xanthate ("ZIPX") and the mixtures of these compounds.

Mention will be made, among the vulcanisation retarders, for example, of N-cyclohexyl-thiophthalimide (abbreviated to "CTP"), sold under the name Vulkalent G by Lanxess, N-(trichloromethylthio)benzenesulphonamide sold under the name Vulkalent E/C by Lanxess, or also phthalic anhydride, sold under the name Vulkalent B/C by Lanxess. All carbon blacks, in particular blacks of the HAF, ISAF or SAF type, conventionally used in tyres ("tyre-grade" blacks) are suitable as carbon blacks. Mention will more particularly be made, among these, of carbon blacks of 300, 600 or 700 grade (ASTM) (for example, N326, N330, N347, N375, N683 or N772). Precipitated or fumed silicas exhibiting a BET specific surface of less than 450 $m^2/g$, preferably of 30 to 400 $m^2/g$, are suitable in particular as silicas.

A person skilled in the art will know, in the light of the present description, to adjust the formulation of the rubber composition in order to achieve the desired levels of properties (in particular modulus Ms) and to adapt the formulation to the specific application envisaged.

It is well known to increase the stiffness of rubber compositions by increasing, for example, their content of reinforcing filler, the content of sulphur and other vulcanisation agents, or also by introducing reinforcing resins, it being possible for all these solutions to be combined in order to obtain the highest stiffnesses.

Rubber compositions having a very high modulus which can be used in the context of the present invention, to date normally reserved for regions of the tyres which are more rigid than those of the belt, in particular for the beads of these tyres, have, for example, been described in the patent documents WO 2005/113259 (or U.S. Pat. No. 8,033,311) and WO 2005/113887 (or US 2008/0318077), and also their detailed formulations.

Sulphur is used at a preferred content of between 2 and 15 phr, more preferably between 3 and 12 phr. The primary vulcanisation accelerator, for example a sulphenamide, is used at a preferred content of between 0.5 and 10 phr. The vulcanisation retarder, if it is present, is used at a preferred content of between 0.1 and 2 phr.

The content of reinforcing filler, for example carbon black, and/or inorganic filler, such as silica, is preferably greater than 50 phr, for example of between 60 and 140 phr; it is more preferably still greater than 70 phr, in particular of between 70 and 120 phr.

In the case of the highest stiffnesses, the rubber composition can advantageously also comprise an additional reinforcing resin composed, for example, of a methylene acceptor, such as a phenol/formaldehyde resin, at a preferred content of between 5 and 30 phr, more preferably between 10 and 25 phr, and a methylene donor, such as HMT or H3M, at a preferred content of between 2 and 20 phr, more preferably between 5 and 15 phr.

According to another preferred embodiment, each layer of rubber composition comprises more than 5 phr, preferably between 5 and 30 phr, of a plasticizing agent, preferably in the liquid form at ambient temperature (20° C.), intended to improve the processability of the rubber compositions in the raw state.

By way of examples, any extending oil, whether of aromatic or nonaromatic nature, any plasticizing agent known for its plasticizing properties with respect to diene elastomers, can be used.

Liquid plasticizers selected from the group consisting of naphthenic oils (of low or high viscosity, in particular hydrogenated or non-hydrogenated), paraffinic oils, MES (Medium Extracted Solvates) oils, DAE (Distillate Aromatic Extracts) oils, TDAE (Treated Distillate Aromatic Extracts) oils, RAE (Residual Aromatic Extracts) oils, TRAE (Treated Residual Aromatic Extracts) oils, SRAE (Safety Residual Aromatic Extracts) oils, mineral oils, vegetable oils, ether plasticizers, ester plasticizers, phosphate plasticizers, sulphonate plasticizers and the mixtures of these compounds are particularly suitable.

According to another preferred embodiment, each layer of rubber composition comprises more than 3 phr, preferably between 3 and 15 phr, of a tackifying resin (as a reminder, a resin capable of giving tack, that is to say immediate adhesion by gentle pressure on a support), intended to improve the adhesion in the raw state of the rubber compositions and the calendering process during the manufacture of the multilayer laminate of the invention.

In a way well known to a person skilled in the art, the designation "resin" is reserved for a compound which is, on the one hand, solid at ambient temperature (23° C.) (in contrast to a liquid plasticizing compound, such as an oil) and, on the other hand, compatible (that is to say, miscible at the content used) with the elastomer composition for which it is intended.

These tackifying resins are polymers well known to the person skilled in the art; they can be aliphatic, aromatic, hydrogenated aromatic, of the aliphatic/aromatic type, that is to say based on aliphatic and/or aromatic monomers. They can be natural or synthetic and may or may not be based on petroleum (if such is the case, also known under the name of petroleum resins).

Mention may in particular be made, as examples of such tackifying resins, of those selected from the group consisting of rosins and their derivatives, coumarone resins, phenolic resins, terpene resins (α-pine, β-pine or limonene), terpene/phenol resins, $C_5$ fraction and/or $C_9$ fraction resins, cyclopentadiene and/or dicyclopentadiene resins, α-methylstyrene resins and the mixtures of such resins.

According to a preferred embodiment of the invention, the tackifying resin used exhibits at least any one, more preferably all, of the following characteristics:

- a Tg of greater than 25° C., in particular of between 30° C. and 100° C. (measured by DSC according to Standard ASTM D3418);
- a softening point of greater than 50° C., in particular of between 50° C. and 150° C. (measured, for example, according to Standard ISO 4625—ring-and-ball method;
- a number-average molecular weight (Mn) of between 400 and 2000 g/mol, in particular between 500 and 1500 g/mol (measured, for example, by SEC (size exclusion chromatography) with polystyrene standards).

Preferably, the modulus Ms of each rubber composition is greater than 40 MPa, in particular of between 40 and 120 MPa; more preferably still, it is greater than 50 MPa, in particular of between 50 and 100 MPa.

The measurements of modulus Ms are carried out in tension, unless otherwise indicated, according to Standard ASTM D 412 of 1998 (test specimen "C") (of course, on a test specimen of rubber composition in the crosslinked state, that is to say cured, vulcanised state, as regards the preferred compositions of the crosslinkable type): the "true" secant modulus (that is to say, secant modulus reduced to the real section of the test specimen) at 10% elongation, denoted Ms here and expressed in MPa (standard conditions of temperature and relative humidity according to Standard ASTM D 1349 of 1999), is measured in second elongation (that is to say, after an accommodation cycle).

In the multilayer laminate of the invention, the thickness $e_2$ of each rubber layer is preferably between 0.05 and 2 mm, more preferably between 0.1 and 1 mm. For example, thicknesses of 0.2 to 0.8 mm have proved to be entirely suitable for the reinforcing of a tyre.

Preferably, in particular during use of the multilayer laminate as protective or reinforcing structure for a tyre belt, the multilayer laminate of the invention exhibits a width and a length which are respectively greater than 2.5 mm and than 10 cm, more preferably respectively greater than 5 mm and than 20 cm.

The polymer film can be used as is, that is to say as available commercially, or else cut up again so as to form narrow strips or bands, the width of which can vary to a very large extent according to the applications targeted.

According to a preferred embodiment, in the multilayer laminate of the invention, the polymer film is provided with a layer which is adhesive from the viewpoint of each layer of rubber composition with which it is in contact. Of course, the invention also applies to the cases where no adhesive layer is used, it being possible for the polymer film itself and/or each layer of rubber composition to have a self-adhesive property due to its or their own formulation.

In order to cause the rubber to adhere to the polymer film, it will be possible to use any appropriate adhesive system, for example a simple textile adhesive of the "RFL" (resorcinol/formaldehyde latex) type comprising at least one diene elastomer, such as natural rubber, or any equivalent adhesive known to confer satisfactory adhesion between rubber and conventional thermoplastic fibres, such as fibres made of polyester, of polyamide or of aramid.

By way of example, the adhesive-applying process can essentially comprise the following successive stages: passing through a bath of adhesive, followed by draining (for example by blowing, calibrating) in order to remove the excess adhesive; then drying, for example by passing through an oven (for example for 30 s at 180° C.), and, finally, heat treatment (for example for 30 s at 220° C.).

Before the above application of adhesive, it may be advantageous to activate the surface of the film, for example mechanically and/or physically and/or chemically, in order to improve its hold of adhesive and/or its final adhesion to the rubber. A mechanical treatment can consist, for example, of a preliminary stage of dulling or scoring the surface; a physical treatment can consist, for example, of a treatment with radiation, such as an electron beam; a chemical treatment can, for example, consist of a preliminary passage through a bath of epoxy resin and/or isocyanate compound.

As the surface of the thermoplastic polymer film is generally particularly smooth, it can also be advantageous to add a thickener to the adhesive used, in order to improve the total hold of adhesive of the film during the application of adhesive thereto.

A person skilled in the art will easily understand that, in the multilayer laminate of the invention, the connection between the polymer film and each rubber layer with which it is in contact can be definitively provided during the final curing (crosslinking) of the finished rubber article, in particular of the tyre.

6. EXAMPLES OF THE IMPLEMENTATION OF THE INVENTION

The multilayer laminate of the invention can be used as reinforcing element in any type of finished article or semi-finished product made of rubber, in particular in tyres intended for all types of vehicles, in particular for passenger vehicles or industrial vehicles, such as vans, heavy duty vehicles, earthmoving equipment, aircraft, or other transportation or handling vehicles.

Figure 1:
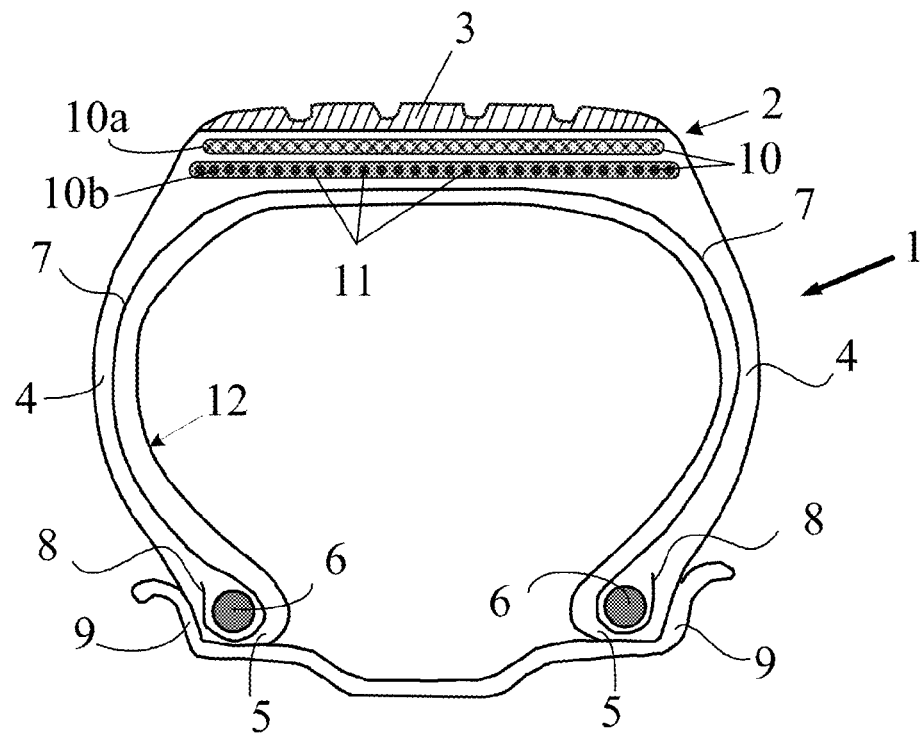

By way of example, the appendant FIG. 1 represents, in a highly diagrammatic fashion, without observing a specific scale, a radial cross section of a tyre in accordance with the invention.

This tyre 1 comprises a crown 2 surmounted by a tread 3, two side walls 4 and two beads 5, each of these beads 5 being reinforced with a bead wire 6. A carcass reinforcement 7 is wound around the two bead wires 6 in each bead 5, the turn-up 8 of this reinforcement 7 being, for example, positioned towards the outside of the tyre 1, which is here represented fitted onto its wheel rim 9. The crown 2 is here reinforced by a crown reinforcement or belt 10 composed of at least two separate reinforcing structures (10a, 10b).

This tyre 1 has the novel and essential characteristic that its belt 10 (or its crown 2, which amounts to the same thing) comprises at least one multilayer laminate 10a in accordance with the invention, positioned radially between the tread 3 and the carcass reinforcement 7, the said multilayer laminate 10a being itself composed of the polymer film described above positioned between the two rubber layers having very high stiffness with which it is in contact.

In this tyre 1 illustrated in FIG. 1, it will be understood that the tread 3, the multilayer laminate of the invention 10a, the crown reinforcing structure 10b and the carcass reinforcement 7 may or may not be in contact with one another, even if these parts have been deliberately separated in FIG. 1, diagrammatically, for reasons of simplification and clarity of the drawing. They might be separated physically, at the very least for a portion of them, for example by bonding rubbers, well known to a person skilled in the art, intended to optimize the cohesion of the assembly after curing or crosslinking.

In FIG. 1, which illustrates a first preferred embodiment of the invention, it is seen that the multilayer laminate 10$a$ of the invention constitutes, within the belt 10, a structure or screen for protecting the crown, located under the tread and charged with protecting the remainder of the belt, in the case in point, in this example, the crown reinforcing structure 10$b$, for external attacks, tears or other perforations which may occur during the rolling of the tyre.

Advantageously, the multilayer laminate of the invention also has the role of constituting a screen, a barrier to water and to oxygen, so many corrosive elements with respect to metal cords present in the remainder of the tyre, in particular in the belt itself or in its carcass reinforcement.

Figure 2:
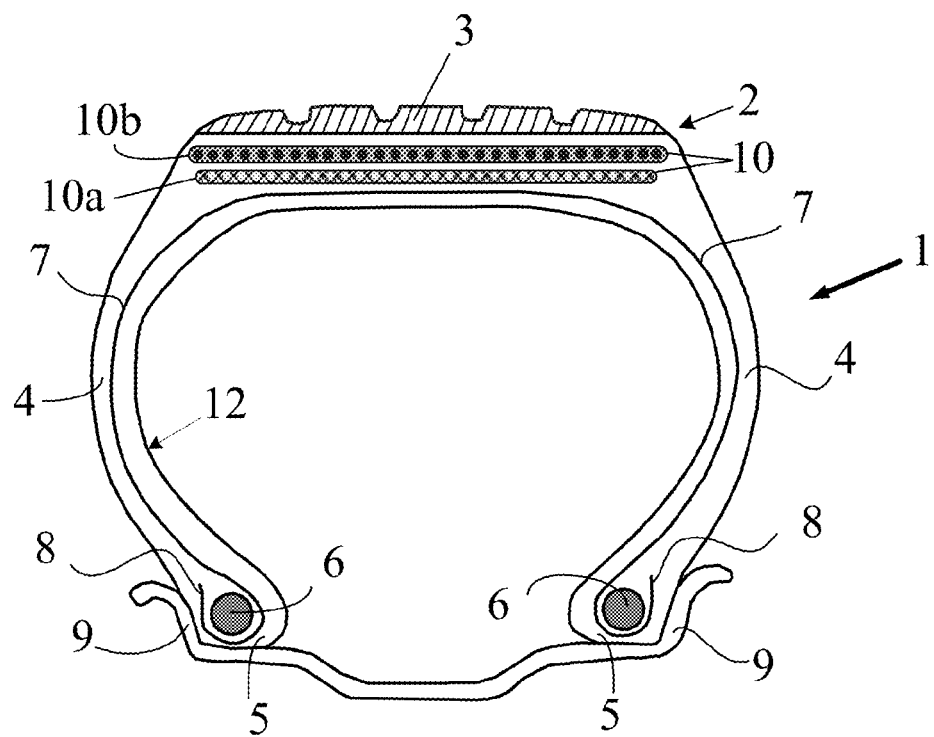

The appendant FIG. 2 illustrates another possible embodiment of the invention, in which the multilayer laminate 10$a$ of the invention constitutes, within this same belt 10, a structure or stream for protecting the crown which this time is located under the crown reinforcing structure 10$b$ and is charged with protecting the remainder of the tyre, in the case in point, in this example, its carcass reinforcement 7.

According to another possible embodiment, two protective structures (multilayer laminates of the invention) 10$a$ of the crown might also be positioned on either side, radially, of the crown reinforcing structure 10$b$.

In the representations above of FIGS. 1 and 2, the carcass reinforcement 7 is, in a way known per se, composed of at least one rubber ply reinforced by "radial" reinforcing threads, for example made of textile or metal, that is to say that these reinforcing threads are positioned virtually parallel to one another and extend from one bead to the other so as to form an angle of between 80° and 90° with the median circumferential plane (plane perpendicular to the axis of rotation of the tyre which is located at mid-distance from the two beads 5 and passes through the middle of the crown reinforcement 10).

These radial reinforcing threads are, for example, made of steel, polyester, nylon, aramid, cellulose or polyketone or also of the hybrid or composite type, that is to say are composed of a mixture of the abovementioned materials, such as, for example, hybrid aramid/nylon cords.

The crown reinforcing structure 10$b$ of the belt 10 is, for example, composed, in a way known per se, of at least one rubber ply reinforced by "circumferential" reinforcing threads 11, for example of textile or metal, that is to say that these reinforcing threads are positioned virtually parallel to one another and extend substantially circumferentially around the tyre so as to form an angle preferably within a range from 0° to 10° with the median circumferential plane. The primary role of these circumferential reinforcing threads 11 is, it should be remembered, to withstand the centrifuging of the crown at high speed.

Use may be made, as examples of circumferential reinforcing threads 11, for example, of cords made of carbon steel or of stainless steel, textile cords composed of fibres twisted together, in particular and preferably cords known for their dimensional stability relative to temperature and/or moisture. The textile fibres of these cords are, for example, selected from the group consisting of polyvinyl alcohol fibres, aromatic polyamide (or "aramid") fibres, aliphatic polyamide (or nylon) fibres, polyester (for example, PET or PEN) fibres, aromatic polyester fibres, cellulose (for example, rayon or viscose) fibres, polyphenylene benzobisoxazole fibres, polyketone fibres, glass fibres, carbon fibres and ceramic fibres. Particularly preferably, mention will in particular be made of reinforcing threads made of carbon steel, aramid, polyester, nylon, cellulose or polyketone and also hybrid reinforcing threads composed of these different materials, such as aramid/nylon cords. The reinforcing threads 11 can be positioned in the belt in just one layer, indeed even in several radially superimposed layers, according in particular to their modulus in extension, their density in the rubber and more generally the specific architecture under consideration of the tyre and of its belt.

The above radial or circumferential reinforcing threads can take any known form; they can, for example, be individual monofilaments having a large diameter (for example and preferably equal to or greater than 50 μm), multifilament fibres (composed of a plurality of individual filaments having a small diameter, typically less than 30 μm), textile folded yarns formed of several fibres twisted together, textile or metal cords formed of several fibres or monofilaments cabled or twisted together.

The reinforcing structure 10$b$ of the belt 10 may also comprise, in a way well known to a person skilled in the art, at least two superimposed and crossed plies, known as "working plies" or "triangulation plies", reinforced with metal cords positioned substantially parallel with respect to one another and inclined with respect to the median circumferential plane, it being possible for these working plies to be combined or not combined with other rubber plies and/or fabrics. The primary role of these working plies is to give the tyre a high cornering stiffness.

FIG. 3 gives a very simple diagrammatical representation of an example of a multilayer laminate in accordance with the invention (10$a$). In this laminate of the invention, the width "L" of the film (100) is preferably identical to the width of the two rubber layers (101) between which it is positioned. However, the invention applies, of course, to the cases where this width L is different, smaller or greater; for example, the polymer film, in this multilayer laminate in accordance with the invention, might be composed of a plurality of narrower strips or bands, which may or may not be juxtaposed, which are oriented along a main direction identical to or different from that of the two rubber layers.

Use is made, as example, of a film (100) of biaxially drawn PET (Mylar A from DuPont Teijin Films, with a thickness $e_1$ equal to approximately 0.5 mm), of the multiaxially drawn thermoplastic polymer type, which exhibits, whatever the tensile direction under consideration in the plane of the film, the following mechanical properties:

a modulus in extension E of greater than 500 MPa;
a maximum tensile stress $\sigma_{max}$ of greater than 100 MPa;
a yield point Yp of between 5% and 10%;
an elongation at break Eb of greater than 20%.

Such properties are easily deduced from the stress/strain curves, such as were, for example, reproduced in the abovementioned Application WO 2010/115861. It will be briefly recapitulated here that the curves denoted C1, C2 and C3 reproduced in FIG. 3 of the abovementioned application correspond to a tension led, respectively, along the main orientation of the film corresponding to the direction of extrusion (also known under the name of MD direction for "Machine Direction"), along an orientation normal to the MD direction (known under the name of TD direction for "Transverse Direction") and, finally, along an oblique direction (angle of 45°) with respect to the two preceding directions (MD and TD). The mechanical properties, such as modulus in extension (E), maximum tensile stress ($\sigma_{max}$), yield point Yp and elongation at break (Eb) can be deduced from these stress/strain curves in a way well known to a person skilled in the art, as indicated in this FIG. 3.

These stress/strain curves are recorded and the mechanical properties measured, unless expressly indicated otherwise, according to Standard ASTM D882-09, on test specimens of films in the form of dumbbells with a width of 4 mm and a length of 30 mm (working part subjected to tensile testing) and with a thickness $e_1$ equal to that of the polymer film tested, which are subjected to tensile testing at a rate of 200 mm/min.

The multilayer laminate 10*a* represented diagrammatically in FIG. 3 (prepared conventionally by calendering) is thus, in this example, composed of the film 100 of biaxially drawn PET, sandwiched between two layers 101 of rubber composition with a thickness $e_2$, for example equal to approximately 0.4 mm, the laminate thus having a total thickness ($e_1+2e_2$), for example of approximately 1.3 mm.

The rubber composition used here is a composition of high stiffness (modulus Ms equal to approximately 55 MPa) typically of the type for tyre beads (5), based on natural rubber, carbon black (approximately 75 phr), reinforcing resin (approximately 20 phr of phenolic resin in combination with approximately 8 phr of H3M and HMT), antioxidant, a vulcanization system having a high sulphur content (approximately 5 phr) and normal vulcanization additives; in addition, it comprises approximately 10 phr of paraffinic oil and 8 phr of tackifying resin (butylphenol/acetylene resin). The adhesion between the PET film and each rubber layer is provided by an adhesive of the RFL type which was deposited in a known way, as indicated above.

Laboratory perforation tests, as already described in the abovementioned Application WO 2010/115861, were first of all carried out on the above multilayer laminate.

They demonstrated that the laminate of the invention, in comparison with the laminate of the prior art comprising rubber layers having a conventional modulus (Ms) (i.e., approximately 10 MPa), exhibits an at least equivalent resistance to perforation, that is to say an excellent resistance to perforation for both types of laminates, from the viewpoint of their markedly reduced thickness in comparison with that of conventional metal fabrics.

Running tests on passenger vehicle tyres (dimensions 205/55 R16) were then carried out on automatic rolling machines, both on tyres of the invention and control tyres (according to WO 2010/115861), in which the drift thrust, the endurance under very strong cornering and the rolling resistance were characterized.

In these tests, the belt (10) of the tyre (1) was composed simply of the multilayer laminate as described above (10*a*) and of a reinforcing structure (10*b*) (circumferential reinforcing threads 11 made of aramid (folded yarns composed of 2 strands of 167 tex twisted together at 315 rad/min), as represented diagrammatically in FIG. 2. The biaxially drawn PET film was provided here in the form of parallel bands, ribbons with a width of approximately 25 mm, on the one hand positioned side by side in one and the same plane between the two layers of rubber having high modulus were separated from one another by a distance (step) of approximately 2 mm and on the other hand inclined by 40° with respect to the median circumferential plane, as described in the abovementioned Application WO 2010/115861.

The control tyres (according to WO 2010/115861) and the tyres of the present invention had the same architecture, except for the modulus (and thus the formulation) of the two rubber layers surrounding the ribbons of biaxially drawn PET film: normal composition (Ms equal to 8 MPa) for calendering of belt in the case of the control tyres, composition described above (Ms equal to approximately 55 MPa) for the tyres of the invention.

The rolling resistance was measured on a rolling drum, according to the ISO 87-67 (1992) method.

For the measurement of the drift thrust, each tyre was fitted to a wheel of suitable size and inflated to 2.4 bar. It is run at a constant speed of 80 km/h on a suitable automatic machine (machine of "Flat-Trac" type sold by MTS). The load, denoted "Z", is varied, at a drift angle of 1°, and the cornering stiffness or drift thrust, denoted "D" (corrected for the thrust at zero drift), is measured, in a known manner, by recording, with the help of sensors, the transverse force on the wheel as a function of this load Z; the drift thrust is the gradient at the origin of the D(Z) curve.

Finally, the endurance under very strong cornering was tested in a known way, according to different predetermined cycles of pressure and excess load, at constant speed and under different angles of strong cornering (more specifically here, according to the "MICH2MF" method described in the publication "*Michelin Indoor Characterization for Handling Applied to Mathematical Formulae*", Jérémy Buisson, Aachener Kolloquium Fahrzeug- and Motorentechnik, 2006); after which, the condition of the pattern bottom areas of the tread of each tyre tested was examined in order to identify and, where appropriate, number possible breaks or cracks which might be due to a separation, migration of the PET ribbons in the crown region of the tyre under the extremely severe rolling conditions of this type of test.

On conclusion of the combined tests above, it was found that the tyres of the invention, compared with the control tyres, exhibit:

- a substantially increased drift thrust (approximately +15%), synonymous with an improved road behaviour for the tyres of the invention;
- an improvement in endurance under very strong cornering, with initiations of cracking in a notably reduced amount and which are markedly less pronounced;
- a significant reduction (−3%, i.e. a saving of approximately 250 g per ton) in rolling resistance, which is entirely significant for a person skilled in the art.

A person skilled in the art of tyres expected, on using layers of rubber composition having a higher stiffness in the belt, the hysteresis to be detrimentally affected and thus the rolling resistance of the tyre to be increased. Surprisingly, this is not at all the case.

In conclusion, the use of the specific multilayer laminate of the invention in a tyre belt thus makes it possible to reduce the rolling resistance without having a detrimental effect on, indeed even while improving, the other rolling properties of the tyre, in particular those of drift thrust and of endurance under very strong cornering.

In addition, the invention makes possible the construction of tyres, the structure of the crown of which can advantageously be simplified, it being possible for the belt of the tyre to consist simply of a multilayer laminate according to the invention in combination with circumferential reinforcing threads, in particular made of aramid, embedded in at least one (that is to say, one or more) rubber layer.

The invention claimed is:
1. A tyre comprising a multilayer laminate,
wherein the multilayer laminate includes at least one polymer film, wherein each polymer film has a Young's modulus E, in any tensile direction in a plane of the film, greater than 500 MPa, wherein each polymer film is positioned between and in contact with two layers formed of a rubber composition, and wherein each layer formed of the rubber composition exhibits, in a crosslinked state, a secant modulus Ms, in extension at 10% elongation, greater than 40 MPa.

2. The tyre according to claim 1, wherein the multilayer laminate is included as a reinforcement in a belt of the tyre.

3. The tyre according to claim 2, wherein the belt includes the multilayer laminate in combination with circumferential reinforcing threads embedded in at least one rubber layer other than the layers formed of the rubber composition.

4. The tyre according to claim 1, wherein the Young's modulus E, for each polymer film in any tensile direction in the plane of the film, is greater than 2000 MPa.

5. The tyre according to claim 1, wherein each polymer film exhibits a maximum tensile stress $\sigma_{max}$ greater than 100 MPa, in any tensile direction considered in a plane of the polymer film.

6. The tyre according to claim 1, wherein the rubber composition includes a diene rubber.

7. The tyre according to claim 6, wherein the diene rubber is selected from a group of elastomers consisting of: polybutadienes, natural rubber, synthetic polyisoprenes, butadiene copolymers, isoprene copolymers, and mixtures thereof.

8. The tyre according to claim 7, wherein each layer formed of the rubber composition includes from 50 to 100 phr of natural rubber.

9. The tyre according to claim 1, wherein each layer formed of the rubber composition includes more than 5 phr of a plasticizing agent, with between 5 and 30 phr of the plasticizing agent being preferable.

10. The tyre according to claim 1, wherein each layer formed of the rubber composition includes a tackifying resin at a content of greater than 3 phr.

11. The tyre according to claim 1, wherein the secant modulus Ms of each layer formed of the rubber composition is between 40 and 150 MPa.

12. The tyre according to claim 1, wherein the Young's modulus E, for each polymer film in any tensile direction in the plane of the film, is greater than 1000 MPa.

13. The tyre according to claim 1, wherein each polymer film exhibits a maximum tensile stress $\sigma_{max}$ greater than 80 MPa, in any tensile direction considered in a plane of the polymer film.

14. The tyre according to claim 1, wherein the polymer film is a thermoplastic polymer film.

15. The tyre according to claim 14, where the thermoplastic polymer film exhibits, after 30 minutes at 150° C., a relative contraction in length of less than 5%.

16. The tyre according to claim 14, wherein the thermoplastic polymer film includes a polyester or a polyamide.

17. The tyre according to claim 14, wherein the thermoplastic polymer film includes a polyester, and wherein the polyester is a polyethylene terephthalate or a polyethylene naphthalate.

* * * * *

UNITED STATES PATENT AND TRADEMARK OFFICE
CERTIFICATE OF CORRECTION

PATENT NO. : 9,751,364 B2  
APPLICATION NO. : 14/373273  
DATED : September 5, 2017  
INVENTOR(S) : Jean-Michel Huyghe et al.

Page 1 of 1

It is certified that error appears in the above-identified patent and that said Letters Patent is hereby corrected as shown below:

On the Title Page

Item (71) Applicants
"ESTABLISSEMENTS" should read --ETABLISSEMENTS--.

Item (87) PCT Pub. Date
"June 9, 2013" should read --September 6, 2013--.

Item (56) OTHER PUBLICATIONS
"Fahrzeug-and" should read --Fahrzeug-und--.

In the Specification

Column 5
Line 64, "tyre," should read --a tyre,--.

Column 6
Line 41, "prene/-butadiene" should read --prene-butadiene--.
Line 42, "isoprene/butadiene/-styrene" should read --isoprene-butadiene-styrene--.

Signed and Sealed this
Twelfth Day of December, 2017

Joseph Matal
*Performing the Functions and Duties of the
Under Secretary of Commerce for Intellectual Property and
Director of the United States Patent and Trademark Office*